(12) United States Patent
Foster

(10) Patent No.: US 6,889,819 B1
(45) Date of Patent: May 10, 2005

(54) RECIPROCATING FLOOR CONVEYOR WITH SPLASH GUARD BEARINGS

(75) Inventor: Raymond Keith Foster, Madras, OR (US)

(73) Assignee: Keith Investments LLC, Madras, OR (US)

( * ) Notice: Subject to any disclaimer, the term of this patent is extended or adjusted under 35 U.S.C. 154(b) by 0 days.

(21) Appl. No.: 10/743,992

(22) Filed: Dec. 23, 2003

(51) Int. Cl.[7] ............................................. B65G 25/04
(52) U.S. Cl. ................................. 198/750.3; 198/750.1
(58) Field of Search ........................... 198/750.1, 750.3, 198/750.4

(56) References Cited

U.S. PATENT DOCUMENTS 4,984,679 A * 1/1991 Foster ..................... 198/750.3
5,482,155 A * 1/1996 Foster ..................... 198/750.2
5,655,645 A * 8/1997 Foster ..................... 198/750.3
5,806,660 A * 9/1998 Foster ..................... 198/750.3
5,860,507 A * 1/1999 Foster ..................... 198/750.3
6,651,806 B2 * 11/2003 Hallstrom ................ 198/750.3

* cited by examiner

*Primary Examiner*—James R. Bidwell
(74) *Attorney, Agent, or Firm*—Delbert J. Barnard

(57) ABSTRACT

A plurality of hold-down bearings (12) are locked into position on longitudinal guide beams (12, 12'). Anti-splash bearings (10) are positioned on the guide beams (12, 12') longitudinally between the hold-down bearings (12). The anti-splash bearings have bottom flaps (46, 48) which contact bottom flanges (36, 38) on the floor slats (20) and block the upward flow of water into the region below the conveyor slats (20). The hold-down bearings (20) also block to a considerable extent the upward movement of water into the underneath regions of the conveyor slats (20).

8 Claims, 3 Drawing Sheets

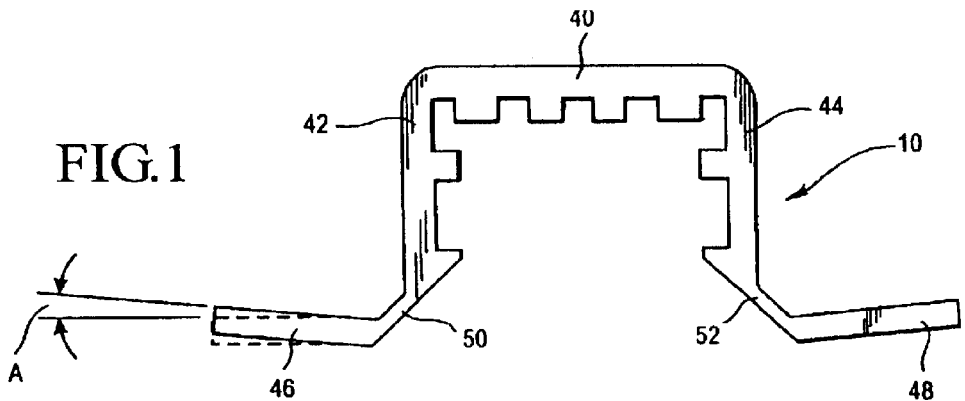
FIG.1
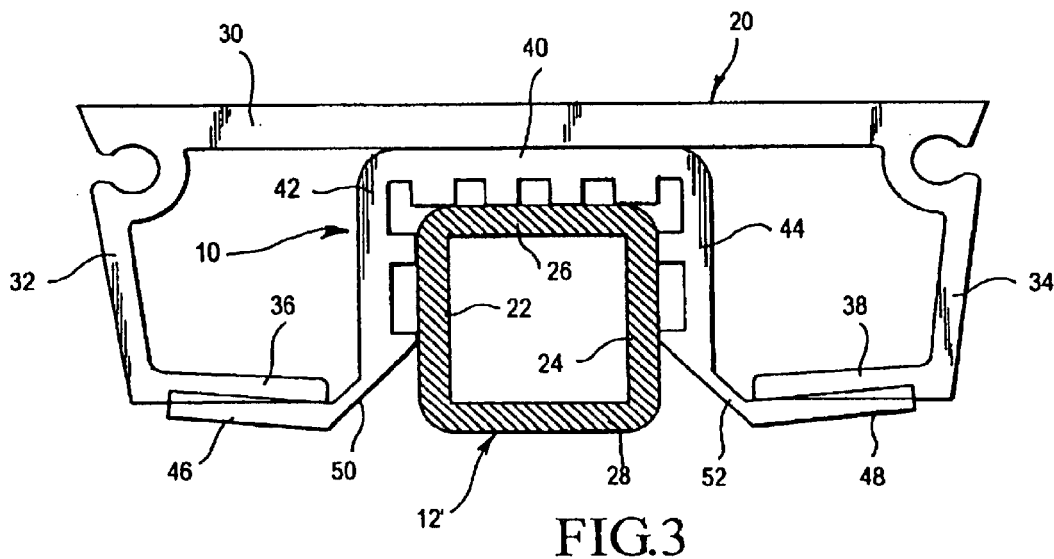
FIG.2
FIG.3

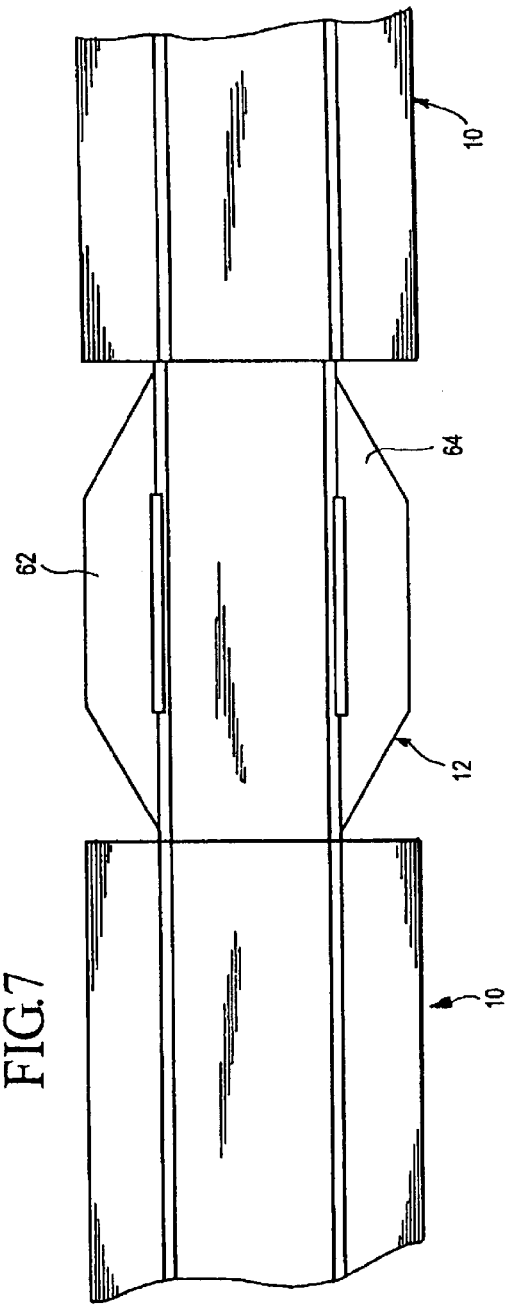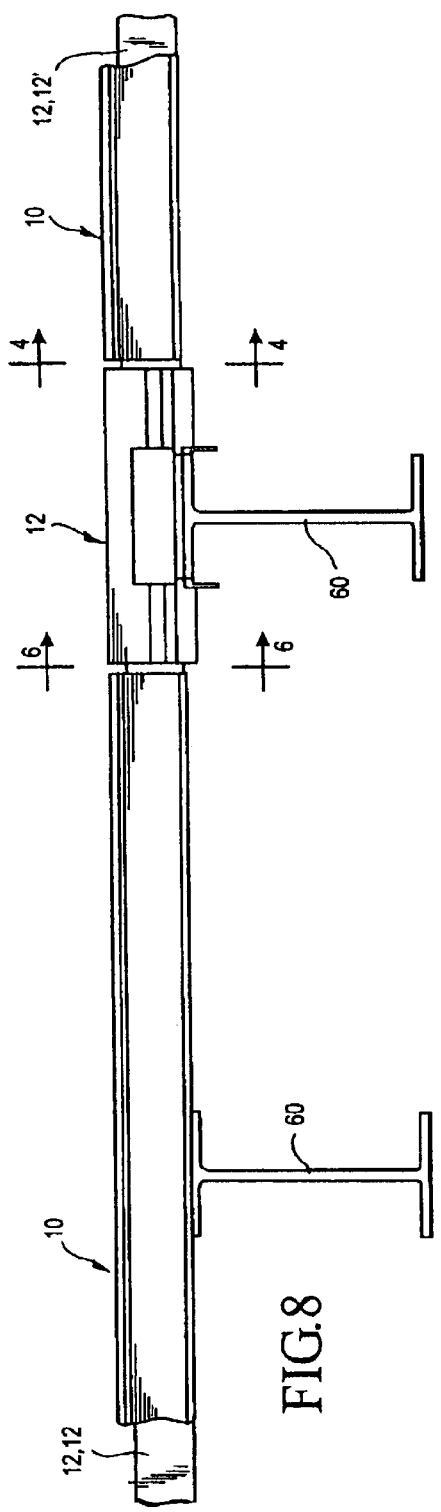

RECIPROCATING FLOOR CONVEYOR WITH SPLASH GUARD BEARINGS

TECHNICAL FIELD

This invention relates to reciprocating floor conveyors. More particularly, it relates to a system of bearings for the conveyor slats in which most of the bearing length is occupied by bearings that are adapted to guard against road water splashing upwardly against the undersides of the conveyor slats.

BACKGROUND ART

A typical arrangement of beams, bearings and slats in a reciprocating slat conveyor is disclosed by my U.S. Pat. No. 4,899,870, granted Feb. 13, 1990, and entitled Reciprocating Floor Conveyor With Snap-On Floor Members. Longitudinal guide beams that support the bearings are designated 14 in U.S. Pat. No. 4,899,870 (FIG. 1). The bearings are designated 122 (FIGS. 6–8). Special hold-down members are designated 80 (FIGS. 9–13). The bearings 122 are positioned on the guide beams 14 where the guide beams 14 cross over and are secured to transverse support beams 12. In this system, there are longitudinal spaces between the bearings 122 that are open and when the conveyor is used in a truck or trailer, water off the road can and will splash upwardly against the underneath sides of the conveyor slats in the open regions. There is a need to substantially close the open regions so as to guard against the upward splash of road water against the underneath sides of the conveyor slats. It is the principal object of this invention to address this need by the use of both old and new technology.

The old technology includes continuing the use of the transverse support beams, the longitudinal guide beams, the bearings and/or special hold-down members, and conventional conveyor slats. Examples of all these components are disclosed in the aforementioned U.S. Pat. No. 4,899,870. The present invention provides for use with these known components a unique splash guard bearing that both functions as a bearing and guards against the upward splash of road water against the underneath sides of the conveyor slats.

The subject invention is an improvement on or a variation of the system disclosed by U.S. Ser. No. 10/449,976, filed May 29, 2003, by Manfred W. Quaeck, and entitled Sealless Reciprocating Slat Conveyor Having Vertically Installable Components, and now owned by me.

BRIEF SUMMARY OF THE INVENTION

The reciprocating slat conveyor of the present invention is basically characterized by a plurality of laterally spaced apart guide beams, at least one hold-down bearing on each guide beam, and at least one anti-splash bearing on each guide beam, positioned endwise of the hold-down bearing. Each conveyor slat has a top, opposite sidewalls, and bottom flanges extending laterally inwardly from the sidewalls. An inner space is defined in each conveyor slat, below the top, between the sidewalls and above the bottom flanges. Each hold-down bearing is positioned partially within the inner space of the slat. Each hold-down bearing has a lower portion holding it against vertical movement up off its guide beam and an upper portion that is within the inner space of the slat and has downwardly directed surfaces that confront and are positioned directly above inner edge portions of the bottom flanges. The anti-splash bearing has an upper portion that rests on the guide beam, opposite side portions that depend downwardly from the upper portion, and laterally outwardly projecting flaps. The flaps extend laterally outwardly from the side portions of the anti-splash bearing, below the bottom flanges of the conveyor slat. The flaps block upward movement of water from below the conveyor to the undersides of the slats in the length regions of the conveyor where the anti-splash bearings are located.

Other objects, advantages and features of the invention will become apparent from the description of the best mode set forth below, from the drawings, from the claims, and from the principles that are embodied in the specific structures that are illustrated and described herein.

BRIEF DESCRIPTION OF THE SEVERAL VIEWS OF THE DRAWING

Like reference numerals are used to designate like parts throughout the several views of the drawing, and:

FIG. 1 is an end view of an anti-splash bearing, including on the left side of the view a solid line showing of the normal position of the flap and a broken line showing of the position taken by the flap when it is bent downwardly by the bottom flange of the conveyor slat;

FIG. 2 is an end view of a conveyor slat, an anti-splash beating and a guide beam; with the flaps on the bearing shown in their natural position;

FIG. 3 is a view like FIG. 2, but showing a tubular form of guide beam;

FIG. 7 is a fragmentary top plan view showing a hold-down bearing between the end portions of two anti-splash bearings; and FIG. 8 is a side elevational view of the assembly shown by FIG. 7, such view further showing the placement of the hold-down bearing at the intersection of a guide beam and a transverse support beam.

DETAILED DESCRIPTION OF THE INVENTION

Figure 4:
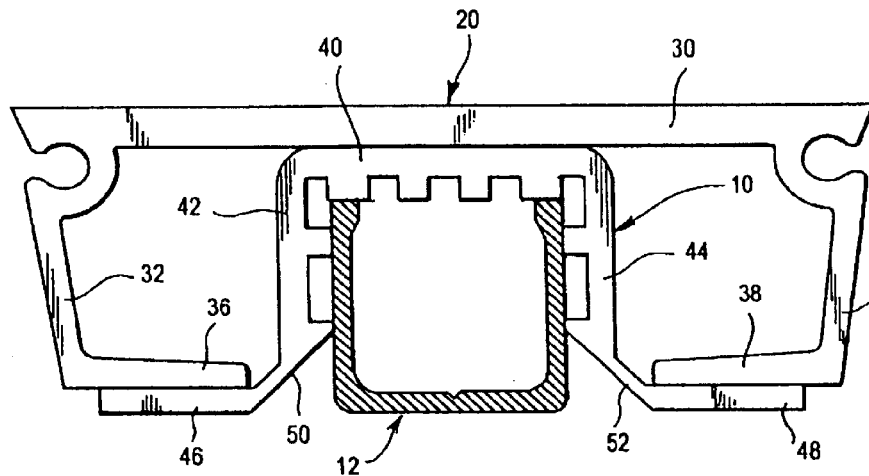
FIG. 4 is a view like FIG. 2, but showing the flaps on the anti-splash bearing moved downwardly by the bottom flanges on the conveyor slats.

FIG. 1 is an end view of a preferred embodiment of the anti-splash bearing 10. As will hereinafter be described in more detail, the bearing 10 is preferably several feet in length and is positioned between two hold-down bearings 12. As stated above, my U.S. Pat. No. 4,899,870 shows a system of transverse support beams, longitudinal guide beams, hold-down bearings on the guide beams where they cross over a transverse beam, and conveyor slats. FIG. 2 shows a guide beam 12 that has a pair of sidewalls 14, 16 and a bottom wall 18, together forming a channel shaped cross section. In this view the anti-splash bearing is shown in the position that it occupies when it is on the guide beam 12, below the floor slat 20. FIG. 3 is like FIG. 2 except that the guide beam 12' is a tubular member, measuring about one inch by one inch in section, for example. Tubular beam 12' includes sidewalls 22, 24, a top wall 26 and a bottom wall 28.

Conveyor slat 20 has a top wall 30, opposite sidewalls 32, 34 and bottom flanges 36, 38.

The anti-splash bearing 10 has a top 40, opposite sidewalls 42, 44 that depend downwardly from the top wall 40, and flaps 46, 48 that are connected to the sidewalls 42, 44, preferably by diagonal hinge sections 50, 52. As illustrated, the hinge sections 50, 52 are preferably thinner than the sidewalls 42, 44 and the flaps 46, 48. This encourages most if not all bending to occur in the regions of the hinge sections 50, 52.

Figure 5:
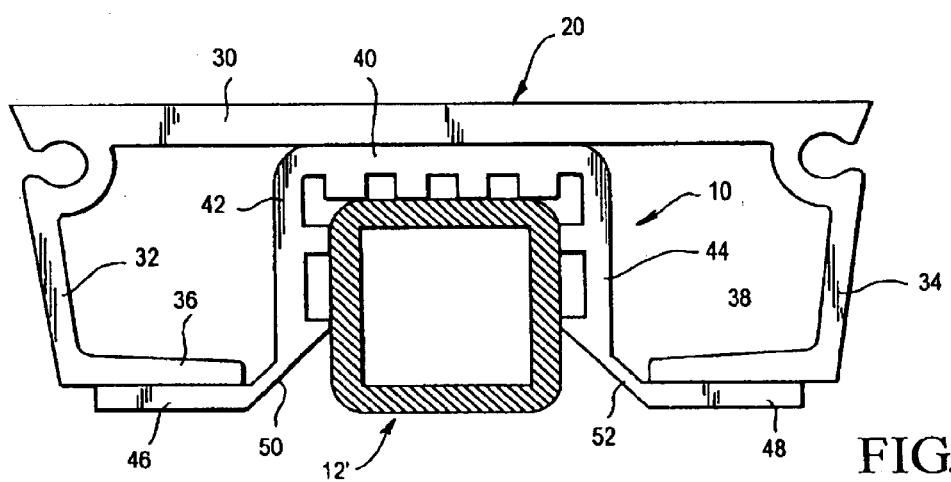
FIG. 5 is a view like FIG. 3, but showing the flaps on the anti-splash bearing moved downwardly by contact with the bottom flanges on the conveyor slat, such view being taken substantially along line 5—5 of FIG. 8.
Figure 6:
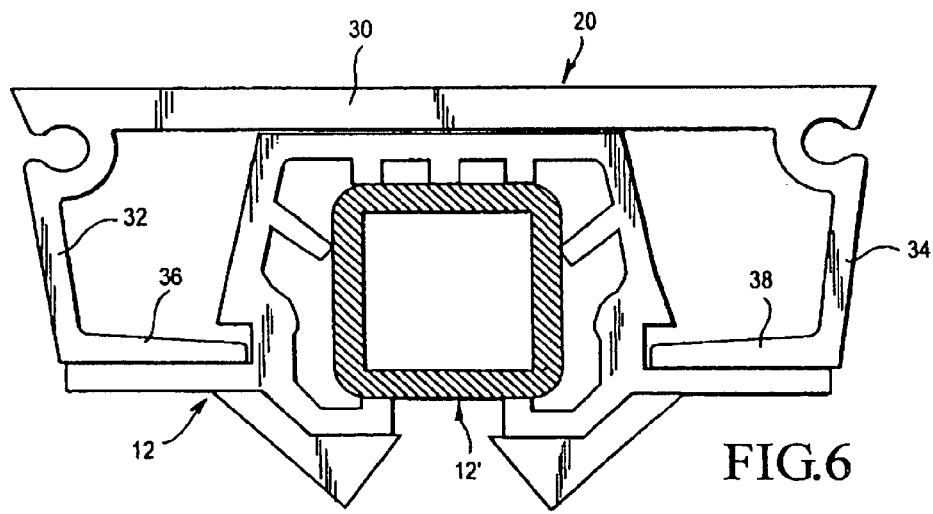
FIG. 6 is a cross-sectional view taken substantially along line 6—6 of FIG. 7.

Comparing FIG. 2 with FIG. 4 and FIG. 3 with FIG. 5, when the conveyor slat 20 is set down on the top wall 40 of the anti-splash bearing 10, the bottom flanges 36, 38 contact and bend downwardly the flaps 46, 48. The flaps 46, 48 are bent downwardly from the positions shown in FIGS. 1–3 to the positions shown in FIGS. 4 and 5. FIG. 1 shows that the bending occurs through an acute angle a which may be about 2–4 degrees. The contact of the flaps 46, 48 by the bottom flanges 36, 38 is what bends the flaps 46, 48 downwardly. The bending stores in the flaps 46, 48 a certain amount of the spring energy that wants to move the flaps back up into their at rest position. Because such movement is prevented by the bottom flanges 36, 38, the flaps 46, 48 are spring loaded into contact with the lower surfaces of the bottom flanges 36, 38. The anti-splash bearings 10 are not free to slide on the guide beams 12, 12' and so the bottom flanges 36, 38 slide along the flaps 46, 48 as the slats 20 reciprocate. Anti-splash bearing 10 is made from a self-lubricating plastic material and so sliding movement of the bottom flanges 36, 38 along the flaps 46, 48 is facilitated.

FIGS. 7 and 8 show a pair of anti-splash bearings 10 extending in opposite directions from a hold-down bearing 12. In preferred form, each anti-splash bearing 10 extends lengthwise onto the next hold-down bearing 12. Accordingly, the full length of the guide beam 12, 12' is occupied by either an anti-splash bearing 10 or a hold-down bearing 12.

In FIG. 8, the guide beams 12, 18 are shown crossing over transverse support beams 60. Each hold-down bearing 12 is positioned where a guide beam 12, 12' crosses over a transverse support beam 60. In this respect, reference is made to FIG. 7 of the aforementioned U.S. Pat. No. 4,899,870, and in particular to FIG. 7 of that patent. As illustrated and described in U.S. Patent No. 4,899,870, the hold-down bearing is constructed so that it is locked against upward movement off from the guide bearing 12, 12' and is locked against sliding movement along the guide bearing 12, 12'. The construction that accomplishes this locking action is well described in U.S. Pat. No. 4,899,870 and so it will not be repeated herein. Rather, the full contents of U.S. Pat. No. 4,899,870 is hereby incorporated herein by this specific reference.

The construction of the hold-down bearing 12 can vary. For example, it can take the form of the hold-down bearing showing in FIGS. 9–13 of U.S. Pat. No. 4,899,870.

Bearing 12 has side flanges 62, 64 that provide a substantial amount of area that will block the upward movement of water in the regions of the bearing 12. As disclosed in U.S. Pat. No. 4,899,870, the hold-down bearing shown in FIGS. 9–13 of that patent has side flaps 100, 102 that also serve to block the upward flow of water against the underneath sides of the slats 20. As previously described, in the region of the anti-splash bearings 10, the flaps 46, 48 block the upward movement of water into the underneath sides of the slats 20.

A few of the hold-down bearings 12 spaced along the guide beams 12, 12' will provide sufficient hold-down power to prevent the unwanted upper movement of the conveyor slats 20 off from the guide beams 12, 12' because the conveyor slats 20 are held downwardly by the hold-down bearings 12, they will in turn block the unwanted upward movement of the anti-splash bearings 10 off from the guide beams 12, 12', even though the spring energy in flaps 46, 48 will want to move the slats 20 upwardly. The anti-splash bearings 10 are prevented from moving lengthwise along the guide bearings 12, 12' by their positioning between a pair of hold-down bearings 12. The hold-down bearings 12 are locked against sliding movement along the beams 12, 12'. Accordingly, the anti-splash bearings 10 cannot move because their movement are blocked by the hold-down bearings 12.

Of course, given the information that is set forth above, one could construct other embodiments of the present invention. The systems which have been described are all presented for purposes of illustration and not limitation. I am only to be limited to the wording of the claims which follow, and interpreted in accordance with the rules of patent claim interpretation, including use of the doctrine of equivalents.

What is claimed is:

1. A reciprocating slat conveyor, comprising:
   a plurality of laterally spaced apart guide beams;
   at least one hold-down bearing on each guide beam;
   at least one anti-splash bearing on each guide beam, positioned endwise of the hold-down bearing; and
   a conveyor slat on each guide beam, each conveyor slat having a top, opposite sidewalls, and bottom flanges extending laterally inwardly from the sidewalls, with an inner space being defined in each conveyor slat, below the top, between the sidewalls and above the bottom flanges;
   each said hold-down bearing being positioned partially within the inner space of its slat, and having a lower portion holding it against vertical movement up off its guide beam and an upper portion that is within the inner space of the slat and has downwardly directed surfaces that confront and are positioned directly above inner edge portions of the bottom flanges; and
   said anti-splash bearing having an upper portion that rests on the guide beam, opposite side portions that depend downwardly from the upper portion, and laterally outwardly projecting flaps that extend laterally outwardly from the side portions, below the bottom flanges of the conveyor slat, wherein the flaps block upper movement of water from below the conveyor to the underneath sides of the slats in the length regions of the conveyor where the anti-splash bearings are located.

2. The reciprocating slat conveyor of claim 1, wherein the laterally outwardly projecting flaps are in the nature of leaf springs that are formed to slope upwardly as they extend outwardly, and wherein when the conveyor slat is on the anti-splash bearings, the bottom of the floor slats contact the flaps on the anti-splash bearings and bend them downwardly, storing spring energy in the flaps that act to bias the flaps upwardly against the bottom flanges on the conveyor slats.

3. The reciprocating slat conveyor of claim 1, wherein the anti-splash bearings have laterally outwardly and sloping lower regions that connect the side portions of the anti-splash bearings with the laterally outwardly projecting flaps.

4. The reciprocating slat conveyor of claim 2, wherein the anti-splash bearings have laterally outwardly and sloping lower regions that connect the side portions of the anti-splash bearings with the laterally outwardly projecting flaps.

5. The reciprocating slat conveyor of claim 3, wherein the diagonal regions are thinner than the side portions of the hold-down bearing and are thinner than the laterally outwardly projecting flaps, said thinner portions serving as hinge regions wherein most of the bending occurs when the contact between the bottom flanges of the slats bend the outwardly projecting flaps downwardly.

6. The reciprocating slat conveyor of claim 4, wherein the diagonal regions are thinner than the side portions of the hold-down bearing and are thinner than the laterally outwardly projecting flaps, said thinner portions serving as hinge regions wherein most of the bending occurs when the contact between the bottom flanges of the slats bend the outwardly projecting flaps downwardly.

7. The reciprocating slat conveyor of claim 1, comprising a pair of hold-down bearings on each guide beam spaced apart lengthwise of the guide beam, and a substantially continuous anti-splash bearing between the two hold-down bearings.

8. The reciprocating slat conveyor of claim 7, wherein the hold-down bearings have lower portions that block upward movement of water from below the conveyor to the underneath sides of the slats in the regions of the hold-down bearings.

* * * * *